(12) United States Patent
Watanabe et al.

(10) Patent No.: US 10,607,348 B2
(45) Date of Patent: Mar. 31, 2020

(54) UNATTENDED OBJECT MONITORING APPARATUS, UNATTENDED OBJECT MONITORING SYSTEM PROVIDED WITH SAME, AND UNATTENDED OBJECT MONITORING METHOD

(71) Applicant: PANASONIC INTELLECTUAL PROPERTY MANAGEMENT CO., LTD., Osaka (JP)

(72) Inventors: Takeshi Watanabe, Kanagawa (JP); Ryuji Yamazaki, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 168 days.

(21) Appl. No.: 16/063,101

(22) PCT Filed: Nov. 2, 2016

(86) PCT No.: PCT/JP2016/004794
§ 371 (c)(1),
(2) Date: Jun. 15, 2018

(87) PCT Pub. No.: WO2017/110028
PCT Pub. Date: Jun. 29, 2017

(65) Prior Publication Data
US 2019/0259165 A1     Aug. 22, 2019

(30) Foreign Application Priority Data
Dec. 25, 2015   (JP) ................................ 2015-254566

(51) Int. Cl.
*G06T 7/20*     (2017.01)
*G06F 9/54*     (2006.01)
(Continued)

(52) U.S. Cl.
CPC ................ *G06T 7/20* (2013.01); *G06F 9/542* (2013.01); *G06K 9/00771* (2013.01);
(Continued)

(58) Field of Classification Search
USPC .......................... 382/103, 224; 348/143, 169
See application file for complete search history.

(56) References Cited

U.S. PATENT DOCUMENTS 7,382,244 B1 * 6/2008 Donovan ......... G08B 13/19645
340/506
7,683,929 B2 * 3/2010 Elazar .................. G01S 3/7864
348/169
(Continued)

FOREIGN PATENT DOCUMENTS

| JP | 01-245395 | 9/1989 |
| JP | 2011-055270 | 3/2011 |
| JP | 2011-091705 | 5/2011 |

OTHER PUBLICATIONS

M. Lalonde etr al., The current state and TRL assessment of unattended and left-behind object detection technology, Canada Border Service Agency, Defence Research and Devlopment Canada Contract Report DRDC-RDDC-2014-C292, Sep. 2014, pp. 1-25.*
(Continued)

*Primary Examiner* — Ishrat I Sherali
(74) *Attorney, Agent, or Firm* — Greenblum & Bernstein, P.L.C.

(57) ABSTRACT

An alarm issuing time according to the degree of suspiciousness or danger of an unattended object is controlled. Unattended object monitoring apparatus is configured to include image acquisition unit that acquires a captured image of an monitoring area imaged by imaging apparatus, object tracker that detects an object appearing in the monitoring area from the captured image and tracks between the captured images for each detected object, unattended object
(Continued)

detector that detects an object not displaced beyond a predetermined time as an unattended object based on a tracking result for each detected object by the object tracker, unattended object type determination unit that determines a type of the detected unattended object, alarm issuing time controller that controls an alarm issuing time from the time when an unattended object is detected to the time when an alarm is issued based on the determined type of the unattended object.

8 Claims, 14 Drawing Sheets

(51) Int. Cl.
    *G08B 21/22*         (2006.01)
    *H04N 7/18*          (2006.01)
    *G06K 9/00*          (2006.01)
    *G08B 21/24*         (2006.01)

(52) U.S. Cl.
    CPC ............ *G08B 21/22* (2013.01); *G08B 21/24* (2013.01); *H04N 7/18* (2013.01); *H04N 7/183* (2013.01); *H04N 7/185* (2013.01); *G06T 2207/30241* (2013.01)

(56) References Cited

U.S. PATENT DOCUMENTS

| | | | | |
|---|---|---|---|---|
| 8,564,661 | B2* | 10/2013 | Lipton | G08B 13/19608 |
| | | | | 348/143 |
| 9,378,632 | B2* | 6/2016 | Venetianer | G06K 9/00771 |
| 2010/0157089 | A1* | 6/2010 | Pakulski | G06K 9/3241 |
| | | | | 348/222.1 |
| 2010/0271478 | A1* | 10/2010 | Oya | H04N 5/76 |
| | | | | 348/143 |
| 2011/0050901 | A1 | 3/2011 | Oya | |
| 2011/0096922 | A1 | 4/2011 | Oya | |
| 2014/0146172 | A1* | 5/2014 | Kajitani | H04N 7/18 |
| | | | | 348/143 |
| 2016/0259339 | A1* | 9/2016 | High | G06K 9/00805 |
| 2019/0019296 | A1* | 1/2019 | Watanabe | G06T 7/20 |
| 2019/0096220 | A1* | 3/2019 | Anderholm | G06K 9/00369 |

OTHER PUBLICATIONS

International Search Report, issued in International Patent Application No. PCT/JP2016/004794, dated Nov. 29, 2016.
U.S. Appl. No. 16/070,330 to Takeshi Watanabe et al., filed Jul. 16, 2018.

* cited by examiner

FIG. 3

| TYPE OF UNATTENDED OBJECT | ALARMING TIME |
|---|---|
| PAPER BAG | 3 MINUTES |
| BAG | 5 MINUTES |
| CARRY BAG | 10 MINUTES |
| KEROSENE CAN | IMMEDIATELY |
| ⋮ | ⋮ |

UNATTENDED OBJECT MONITORING APPARATUS, UNATTENDED OBJECT MONITORING SYSTEM PROVIDED WITH SAME, AND UNATTENDED OBJECT MONITORING METHOD

TECHNICAL FIELD

The present disclosure relates to an unattended object monitoring apparatus that detects an unattended object left behind in a monitoring area based on captured images of the monitoring area imaged by an imaging apparatus and issues an alarm when an unattended object is detected, an unattended object monitoring system provided with the same, and an unattended object monitoring method.

BACKGROUND ART

In the related art, in a space such as stations, airports, and the like used by a large number of unspecified persons, monitoring of unattended suspicious objects has been performed for the purpose of crime prevention and the like. Monitoring of an unattended object is generally performed by an observer monitoring captured images of a monitoring area imaged by a monitoring camera (imaging apparatus), but it is necessary to automatically detect an unattended object based on captured images of a monitoring area in order to reduce the burden on the observer and improve the accuracy of the detection of the unattended object.

Therefore, various techniques for automatically detecting an unattended object based on captured images of a monitoring area imaged by an imaging apparatus have been proposed (see PTL 1). In the technique in the related art of PTL 1, a difference between an input image of a monitoring target area captured and input at a predetermined time interval and an initial image of the monitoring target area is obtained to cut out the image of a person in the monitoring target area, the person images successively obtained at the predetermined time interval are compared with each other to detect an object image to be separated from the person images, and when the object image is detected, the time for which the object image is left behind measured so that an alarm is issued when a predetermined time has elapsed.

CITATION LIST

Patent Literature

PTL 1: Japanese Patent Unexamined Publication No. 1-245395

SUMMARY OF THE INVENTION

The unattended object monitoring apparatus of the present disclosure is an unattended object monitoring apparatus that detects an unattended object left behind in a monitoring area based on a captured image of the monitoring area imaged by an imaging apparatus and issues an alarm in a case where the unattended object is detected, including a processor, and a memory that stores an instruction, the apparatus further comprising, as a configuration when the processor executes the instruction stored in the memory, an image acquirer that acquires a captured image of an monitoring area imaged by the imaging apparatus, an object tracker that detects an object appearing in the monitoring area from the captured image and tracks between the captured images for each detected object, an unattended object detector that detects an object not displaced beyond a predetermined time as an unattended object based on a tracking result for each detected object by the object tracker, an unattended object type determiner that determines a type of the detected unattended object, and an alarm issuing time controller that controls an alarm issuing time from the time when an unattended object is detected to the time when an alarm is issued according to the determined type of the unattended object.

According to the present disclosure, it is possible to control an alarm issuing time according to the degree of suspiciousness or danger of the unattended object. In this way, it is possible to reduce the burden on the observer when a plurality of unattended objects are detected in the monitoring area at substantially the same time or within a short time, in particular.

BRIEF DESCRIPTION OF DRAWINGS

FIG. 3 is a diagram showing a table in which a correspondence relationship between types of unattended objects and alarm issuing times are stored in advance.

DESCRIPTION OF EMBODIMENTS

Figure 1:
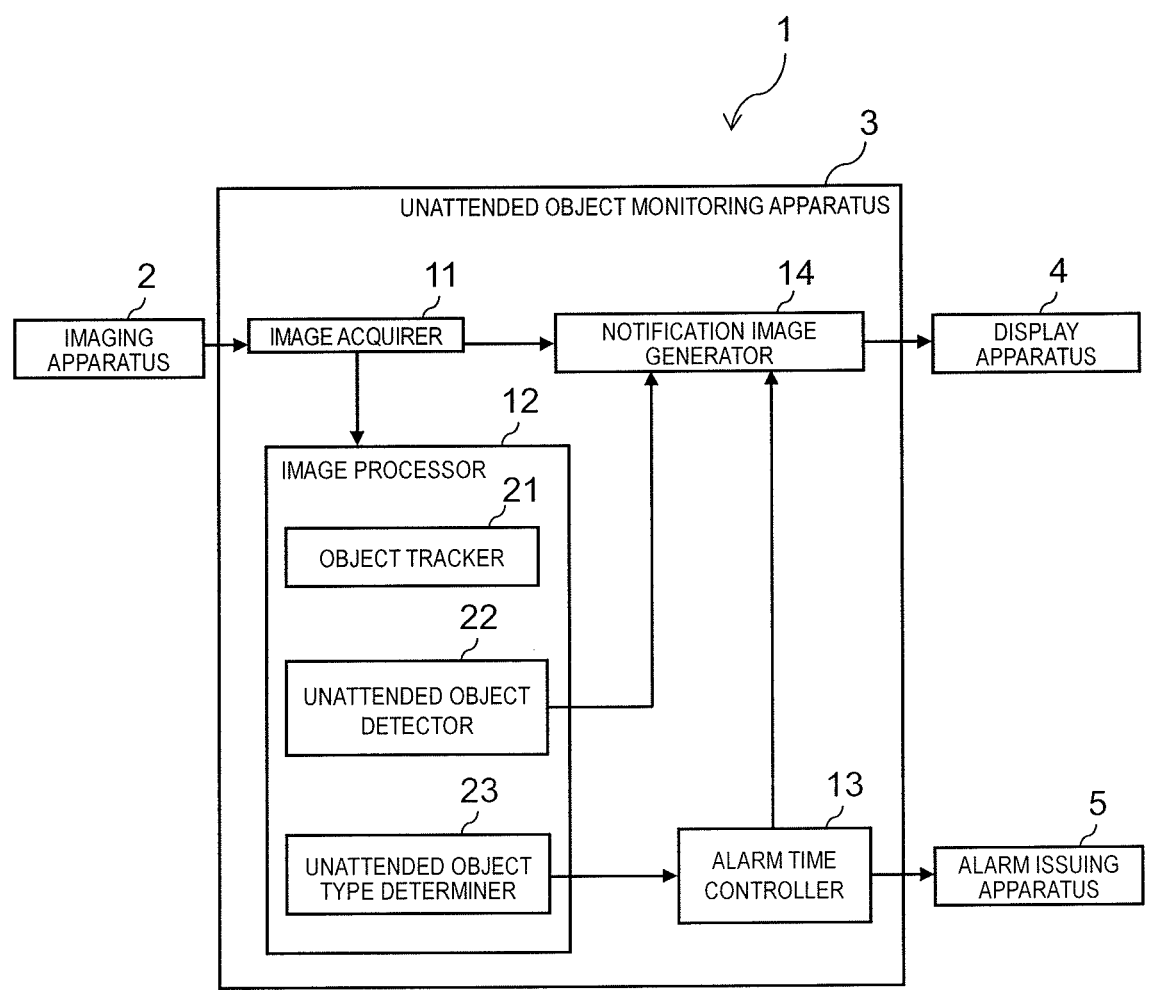
FIG. 1 is a schematic configuration diagram of an unattended object monitoring system according to a first embodiment.

Prior to describing the embodiments, the problems in the related art will be briefly described. Now, in the technique in the related art of PTL 1, since the alarm issuing time, which is the time from when an unattended object is detected to the time when an alarm is issued, is uniform irrespective of the type of the unattended object, in a case where a plurality of unattended objects are detected in the monitoring area at substantially the same time or within a short time, a plurality of alarms will be issued almost simultaneously or continuously. In a case where a plurality of alarms are issued at substantially the same time or continuously, since it is difficult to cope with the alarms at the same time, the observer has to determine the degree of suspiciousness or danger for each unattended object. Therefore, the burden on the observer increases. This is especially noticeable in a case where the monitoring area is congested or in a case where the monitoring area is wide. If the alarm issuing time may be controlled according to the degree of suspiciousness or danger of the unattended object, this is beneficial since it is possible to reduce the burden on the observer when a plurality of unattended objects are detected at substantially the same time or within a short time, particularly in the monitoring area.

The present disclosure has been devised in view of such problems of the related art, and the object of the present invention is to provide an unattended object monitoring apparatus capable of controlling an alarm issuing time according to a degree of suspiciousness or danger of an unattended object, an unattended object monitoring system provided with the same, and an unattended object monitoring method.

A first disclosure made to solve the above problem is an unattended object monitoring apparatus that detects an unattended object left behind in a monitoring area based on a captured image of the monitoring area imaged by an imaging apparatus and issues an alarm in a case where the unattended object is detected, including a processor, and a memory that stores an instruction, the apparatus further comprising, as a configuration when the processor executes the instruction stored in the memory, an image acquirer that acquires a captured image of an monitoring area imaged by the imaging apparatus, an object tracker that detects an object appearing in the monitoring area from the captured image and tracks between the captured images for each detected object, an unattended object detector that detects an object not displaced beyond a predetermined time as an unattended object based on a tracking result for each detected object by the object tracker, an unattended object type determiner that determines a type of the detected unattended object, an alarm issuing time controller that controls an alarm issuing time from the time when an unattended object is detected to the time when an alarm is issued according to the determined type of the unattended object.

According to the unattended object monitoring apparatus according to the first disclosure, because the alarm issuing time from when an unattended object is detected to the time when an alarm is issued may be controlled according to the type of the unattended object, it is possible to control the alarm issuing time according to the degree of suspiciousness or danger of the unattended object. In addition, in this way, it is possible to reduce the burden on the observer when a plurality of unattended objects are detected in the monitoring area at substantially the same time or within a short time, in particular.

In addition, in a case where an unattended object is detected in the first disclosure, a second disclosure includes an unattended object owner detector that detects an owner of the unattended object from the detected object based on a distance to the unattended object and a moving trajectory extractor that extracts a moving trajectory of the owner of the unattended object past the time of detection of the unattended object based on the tracking result for each detected object by the object tracker, in which the alarm issuing time controller controls an alarm issuing time so that an alarm is issued immediately irrespective of the alarm issuing time according to the type of the unattended object in a case where the extracted moving trajectory fits a predetermined condition.

According to the unattended object monitoring apparatus according to the second disclosure, in a case where the moving trajectory of the owner of the unattended object past the time of detection of the unattended object fits the predetermined condition, an alarm may be issued immediately irrespective of the alarm issuing time according to the type of the unattended object. Thus, for example, in a case where the moving trajectory of the owner of the unattended object past the time of detection of the unattended object is meandering largely to the left and right, it is possible to issue an alarm immediately by determining that the owner of the unattended object is highly likely to be a drunken person. By doing this, it is possible to prevent drunken people from forgetting to leave baggage and to protect drunken people quickly.

In addition, in a case where an unattended object is detected in the first disclosure, a third disclosure includes an unattended object owner detector that detects an owner of the unattended object based on a distance to the unattended object and a separation distance detector that detects a separation distance between the unattended object and the owner of the unattended object based on the tracking result for each detected object by the object tracker, in which the alarm issuing time controller controls the alarm issuing time so as not to issue an alarm even if the alarm issuing time according to the type of the unattended object has elapsed in a case where the detected separation distance is less than a predetermined threshold distance.

According to the unattended object monitoring apparatus according to the third disclosure, in a case where the separation distance between the unattended object and the owner of the unattended object is less than a predetermined threshold distance, it is possible to control the alarm issuing time so that an alarm is not issued even if the alarm issuing time according to the type of unattended object has elapsed. As a result, in a case where the owner of the unattended object is present near the unattended object, it is possible to determine that the degree of suspiciousness of the unattended object is low and not to issue an alarm. In addition, in this way, it is possible to further reduce the burden on the observer when a plurality of unattended objects are detected in the monitoring area at substantially the same time or within a short time.

In addition, in the third disclosure, a fourth disclosure includes a separation time meter that measures a separation time from the time when the owner of the unattended object is detected to the time when the separation distance exceeds a predetermined distance, in which the alarm issuing time controller controls the alarm issuing time so that an alarm is issued immediately irrespective of the alarm issuing time according to the type of the unattended object in a case where the measured separation time is less than a predetermined threshold time.

According to the unattended object monitoring apparatus of the fourth disclosure, in the case where the separation time until the separation distance between the unattended object and the owner of the unattended object exceeds the predetermined distance is less than the predetermined threshold time since the owner of the unattended object was detected, an alarm may be issued immediately irrespective of the alarm issuing time according to the type of the unattended object. As a result, in a case where the owner of the unattended object leaves immediately from the unattended object, since the behavior of the owner of the unattended object is suspicious, it is determined that the degree of suspiciousness of the unattended object is high and to immediately issue an alarm.

In addition, when the unattended object or the owner of the unattended object is detected in any one of the first to fourth disclosures, a fifth disclosure includes a notification image generator that generates a notification image in which a frame image surrounding the unattended object or the owner of the unattended object is superimposed on the captured image.

According to the unattended object monitoring apparatus according to the fifth disclosure, when an unattended object or owner of the unattended object is detected, it is possible to visually display the unattended object or the owner of the unattended object to an observer in a visually easy-to-understand manner.

In addition, when the type of the unattended object is determined in any one of the first to fifth disclosures, a sixth disclosure includes a notification image generator that generates a notification image in which information indicating a type of the unattended object is superimposed on the captured image.

According to the unattended object monitoring apparatus according to the sixth disclosure, when the type of the unattended object is determined, it is possible to notify the type of the unattended object to the observer.

In addition, a seventh disclosure is an unattended object monitoring system including the unattended object monitoring apparatus according to any one of the first to sixth disclosures, an imaging apparatus for imaging the monitoring area, and a notification apparatus that notifies a user of the alarm issued from the unattended object monitoring apparatus.

In addition, an eighth disclosure is an unattended object monitoring method for detecting an unattended object left behind in a monitoring area based on a captured image of the monitoring area imaged by an imaging apparatus and issues an alarm in a case where the unattended object is detected, includes acquiring a captured image of an monitoring area imaged by the imaging apparatus, detecting an object appearing in the monitoring area from the captured image and tracks between the captured images for each detected object, detecting an object not displaced beyond a predetermined time as an unattended object based on a tracking result for each detected object, determining a type of the detected unattended object, and controlling an alarm issuing time from the time when an unattended object is detected to the time when an alarm is issued based on the determined type of the unattended object.

Hereinafter, an embodiment of the present disclosure will be described with reference to drawings.

First Embodiment

First, unattended object monitoring system 1 according to a first embodiment of the present disclosure will be described with reference to FIGS. 1 to 5. Unattended object monitoring system 1 is a system for detecting an unattended object left behind in the monitoring area based on the captured image of the monitoring area imaged by imaging apparatus 2 and issuing an alarm in a case where an unattended object is detected, and may be applied to monitoring of unattended suspicious objects in a space such as stations and airports used by a large number of unspecified persons. Hereinafter, a case where unattended object monitoring system 1 according to the present disclosure is applied to monitoring an unattended suspicious object in a station building will be described.

FIG. 1 is a schematic configuration diagram of unattended object monitoring system 1 according to the first embodiment of the present disclosure. As shown in FIG. 1, unattended object monitoring system 1 is configured to include imaging apparatus 2, unattended object monitoring apparatus 3, display apparatus 4, and alarm issuing apparatus 5. Display apparatus 4 and alarm issuing apparatus 5 serve as a notification apparatus for notifying an observer of an alarm. Unattended object monitoring apparatus 3 is connected to imaging apparatus 2, display apparatus 4, and alarm issuing apparatus 5 via wired or wireless communication (for example, Wi-Fi (registered trademark) and the like) such as local area network (LAN). The connection form between unattended object monitoring apparatus 3 and imaging apparatus 2, display apparatus 4, and alarm issuing apparatus 5 is not particularly limited and may be, for example, connection via a network such as the Internet, or the apparatuses may be connected to each other by a communication cable using a general-purpose interface (for example, a universal serial bus (USB) interface).

Imaging apparatus 2 is a general imaging apparatus such as a CCD camera and the like, is installed on a wall, a ceiling, or the like, and images a predetermined monitoring area in time series as a still image or a moving image. Imaging apparatus 2 is not particularly limited in terms of the form, function, arrangement, quantity and the like thereof as far as a monitoring area may be imaged in time series, and various modifications thereof are possible. For example, imaging apparatus 2 may be a panoramic camera installed on a wall or the like and capable of imaging 180 degrees with one unit, or an omnidirectional camera installed on a ceiling or the like and capable of imaging 360 degrees with one unit. A captured image of the monitoring area captured in time series by imaging apparatus 2 is input to unattended object monitoring apparatus 3.

Display apparatus 4 is a general display apparatus such as a monitor (display) installed in a monitoring room or the like where the observer performs monitoring work and displays a notification image (see FIGS. 4A to 4C) output from unattended object monitoring apparatus 3. Details of the notification image will be described later. Display apparatus 4 is not particularly limited in terms of the form, function, arrangement, quantity, and the like thereof as far as the notification image may be displayed, and various modifications are possible. For example, display apparatus 4 may be a display screen of a mobile terminal carried by the observer when leaving the monitoring room for patrol or the like.

Alarm issuing apparatus 5 is a general alarm issuing apparatus such as an alarm buzzer and an alarm lamp and is controlled by unattended object monitoring apparatus 3 to issue an alarm by alarm sound, blinking of the alarm lamp or the like. Alarm issuing apparatus 5 is not particularly limited in terms of the form, function, arrangement, quantity, and the like thereof as long as alarms may be reported, and various modifications are possible.

Unattended object monitoring apparatus 3 is a general computer apparatus and includes a central processing unit (CPU) that comprehensively executes various kinds of information processing, control of peripheral apparatuses, or the like based on a predetermined control program, a random-access memory (RAM) that functions as a work area of the CPU, a read-only memory (ROM) that stores control programs executed by the CPU or data, a network interface that executes communication processing via a network, and the like, which is not shown in detail. Various functions (for example, control processing of alarm issuing time) of unattended object monitoring apparatus 3 to be described in detail later may be realized by the CPU executing a predetermined control program (for example, an alarm issuing time control program). Unattended object monitoring apparatus 3 is not limited to a computer apparatus, and it is also possible to use another information processing apparatus (such as a server and the like) capable of performing the same functions. In addition, at least a part of the functions of the unattended object monitoring apparatus may be replaced by another known hardware processing.

As shown in FIG. 1, unattended object monitoring apparatus 3 includes image acquirer 11, image processor 12, alarm issuing time controller 13, and notification image generator 14, and image processor 12 includes object tracker 21, unattended object detector 22, and unattended object type determiner 23. Each unit is controlled by a controller (not shown).

Image acquirer 11 is connected to imaging apparatus 2 and acquires a captured image of the monitoring area from imaging apparatus 2. Image acquirer 11 is connected to image processor 12 and notification image generator 14, and the captured image acquired by image acquirer 11 from imaging apparatus 2 is input to image processor 12 and notification image generator 14.

Image processor 12 acquires a captured image from image acquirer 11. In a case where the captured image is a still image captured at a predetermined time interval, the captured image is acquired as the still image data, and in a case where the captured image is a moving image, the captured image is acquired as still image data (image frame data) extracted at a predetermined time interval from the moving image. The captured image (still image data) acquired by image processor 12 from image acquirer 11 is processed by object tracker 21, unattended object detector 22, and unattended object type determiner 23.

Object tracker 21 detects an object (hereinafter, referred to as "appearing object") appearing in the monitoring area from the captured image and tracks between the captured images after the detection of the appearing object for each detected appearing object. The appearing object may be a person, a moving object such as a wheelchair, an electric cart, or the like on which a person rides, or another manned or unmanned moving object or the like. Detection of the appearing object is performed by comparing the captured background image with the captured image in advance or by comparing two captured images adjacent to each other in time series. Specifically, a degree of dissimilarity (difference or correlation value) of pixel values (for example, brightness value) of corresponding pixels between the captured images to be compared is obtained, pixels whose obtained dissimilarity exceeds a predetermined threshold are extracted, and an area in which the pixels extracted in close proximity are put together is detected as an appearing object. When an appearing object is detected from the captured image, an individual identification code is assigned to each detected appearing object, and tracking is performed between the captured images after the detection of the appearing object. When a new appearing object appears in the vicinity of the already detected appearing object, it is determined that the new appearing object has been separated from the already detected appearing object. In this case, the identification code of the already detected appearing object is not changed, and an appearing object which has newly appeared is assigned with a new identification code and managed.

Figure 2A:
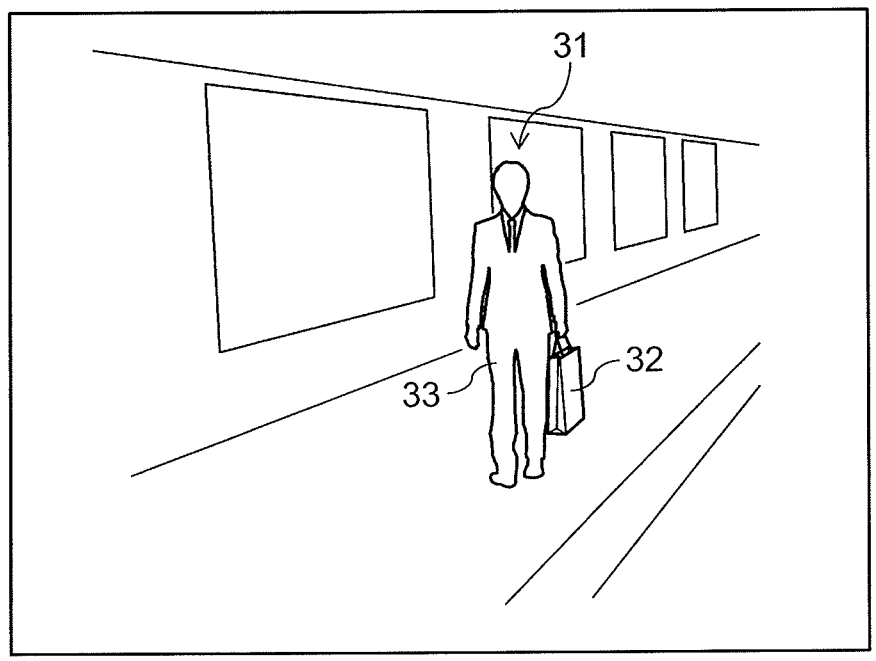
FIG. 2A is a diagram showing an example in which an object (a person having a bag) appearing is detected in a monitoring area from a captured image.
Figure 2B:
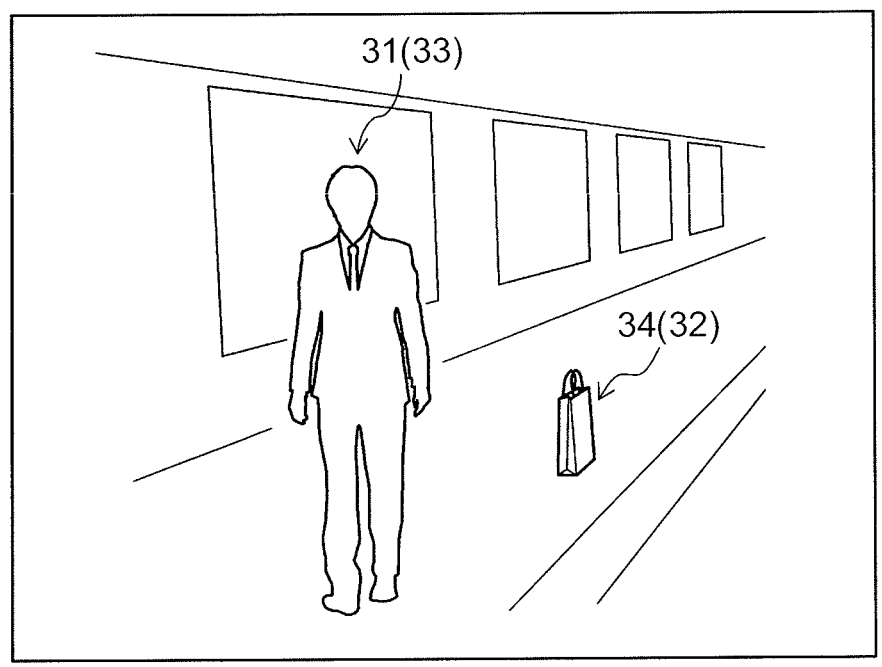
FIG. 2B is a diagram showing an example in which an appearing object (bag) newly appearing is detected in the monitoring area from the captured image.

FIG. 2A is a diagram showing an example in which appearing object 31 appearing in the monitoring area is detected from the captured image by object tracker 21. In the example of FIG. 2A, appearing object 31 is person 33 with paper bag 32. At this time, paper bag 32 and person 33 are not individually identified but are detected as one appearing object 31. FIG. 2B is a diagram showing an example in which appearing object 34 newly appearing in the monitoring area is detected from the captured image by object tracker 21. In the example of FIG. 2B, paper bag 32 separated from person 33 is detected as new appearing object 34. Thereafter, paper bag 32 is tracked as new appearing object 34. In addition, appearing object 31 (that is, person 33) separated by paper bag 32 is tracked as it is as appearing object 31.

Unattended object detector 22 detects an unattended object based on a tracking result for each appearing object by object tracker 21. Specifically, for each appearing object detected by object tracker 21, a temporal displacement in the captured image of the appearing object is obtained, and an appearing object which is not displaced beyond a predetermined time, that is, is stationary beyond a predetermined time is detected as an unattended object. When an unattended object is detected, a unique identification code is assigned to each unattended object, and tracking is performed between the captured images after the detection of the unattended object. In addition, in a case where an unattended object is detected, the detection result is input to notification image generator 14.

Unattended object type determiner 23 determines the type of the unattended object detected by unattended object detector 22. Determination of the type of the unattended object may be performed by using a known image recognition technique. For example, it is preferable to use an identifier that identifies the type of the unattended object based on the shape feature or texture feature of the unattended object detected from the captured image. In this case, a database is prepared, in which a correspondence relationship between the shape feature or textured feature of the unattended object and the type of the unattended object is stored in advance. A method of identifying the type of the unattended object is not particularly limited, and various known methods in the related art may be used. The type of the unattended object determined by unattended object type determiner 23 is input to alarm issuing time controller 13.

Alarm issuing time controller 13 controls the alarm issuing time which is the time from when an unattended object is detected to the time when an, alarm is issued in accordance with the type of unattended object determined by unattended object type determiner 23. Specifically, a table in which the correspondence relationship between the types of unattended objects and alarm issuing times is stored in advance is prepared as shown in FIG. 3, and, the alarm issuing time corresponding to the type of an unattended object is selected with reference to this table. In the table of FIG. 3, the alarm issuing time corresponding to "paper bag" is stored as "3 minutes", the alarm issuing time corresponding to "bag" is stored as "5 minutes", the alarm issuing time corresponding to "carry-bag" is stored as "10 minutes", and the alarm issuing time corresponding to "kerosene can" is stored as "immediately". The type of the unattended object and the corresponding alarm issuing time are just examples, and the type of the unattended object and the corresponding alarm issuing time may be set appropriately.

The degree of suspiciousness and danger vary depending on the type of unattended object. Since the unattended object with a high degree of suspiciousness needs to be removed earlier from the monitoring area, the alarm issuing time is shorten. Since paper bags and bags are highly likely to be suspicious objects, those bags are regarded to have a high degree of suspiciousness, and the alarm issuing time is set as "3 minutes" or "5 minutes" to be shorter. A paper bag is considered to have a higher degree of suspicious than a bag, and the alarm issuing time of the paper bag is set shorter than the bag. On the other hand, because unattended objects with a low degree of suspiciousness do not need to be removed quickly from the monitoring area, the alarm issuing time is set longer. Since it is highly likely that a carry-bag is a neglected item that occurred when a passenger or the like temporarily left the spot for something to do, the degree of suspiciousness is regarded as low, and the alarm issuing time is set to "10 minutes" which is longer. Then, since unattended objects with a high degree of danger need to be immediately removed from the monitoring area, the alarm issuing time is set to "immediately". Since kerosene cans are regarded as dangerous articles, the alarm issuing time is set to "immediately".

In addition, alarm issuing time controller 13 may control alarm issuing apparatus 5. Alarm issuing time controller 13 drives alarm issuing apparatus 5 based on the alarm issuing time selected as described above and issues an alarm notifying the detection of an unattended object by alarm sound, blinking of the alarm lamp, or the like. In addition, the alarm issuing time selected by alarm issuing time controller 13 is input to notification image generator 14, and an alarm is issued via display apparatus 4 by using the notification image generated by notification image generator 14. In the present embodiment, issuing of an alarm is configured to be done via both alarm issuing apparatus 5 and display apparatus 4, but an alarm may be issued via either alarm issuing apparatus 5 or display apparatus 4.

Figure 4A:
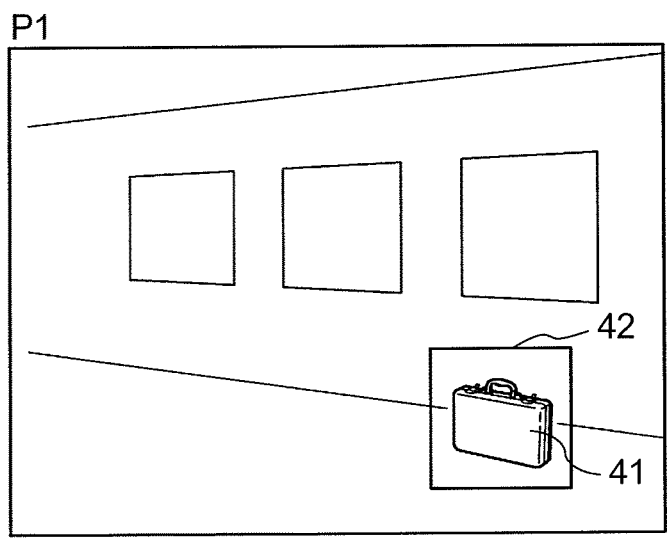
FIG. 4A is a diagram showing an example of notification image P1.

When an unattended object is detected by unattended object detector 22, notification image generator 14 superimposes a frame image surrounding the unattended object on the captured image input from image acquirer 11 to generate notification image P1. FIG. 4A is a diagram showing an example of notification image P1. In the example of FIG. 4A, bag 41 is detected as an unattended object, and notification image P1 in which frame image 42 surrounding bag 41 is superimposed on the captured image is generated.

Figure 4B:
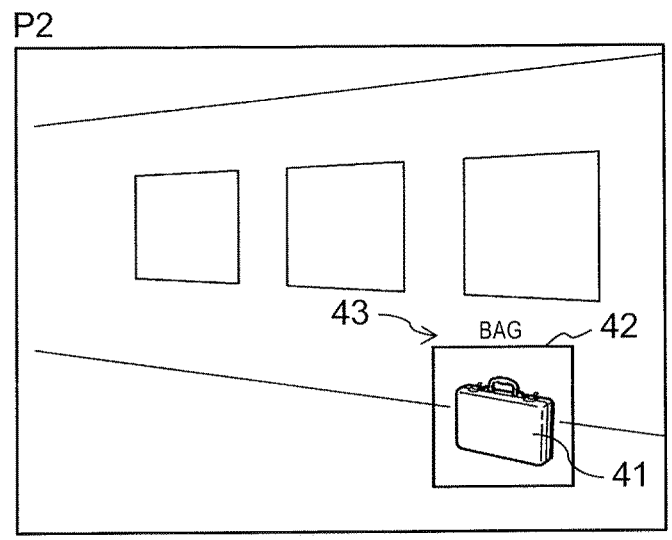
FIG. 4B is a diagram showing an example of notification image P2.

In addition, when unattended object type determiner 23 determines the type of the unattended object, notification image generator 14 further generates notification image P2 by further superimposing information indicating the type of the unattended object on notification image P1 shown in FIG. 4A. As the information indicating the type of the unattended object, for example, letters having a name of the type of the unattended object may be used. FIG. 4B is a diagram showing an example of notification image P2. In the example of FIG. 4B, since unattended object is bag 41, notification image P2 in which letters 43 "bag" is superimposed on notification image P1 is generated as information indicating the type of the unattended object. The information indicating the type of the unattended object is not limited to the letters of the name of the type of the unattended object, but may be, for example, a picture or a symbol indicating the type of the unattended object. In addition, in the present embodiment, both notification image P1 and notification image P2 are generated, but only one of notification image P1 or notification image P2 may be generated. In addition, the information indicating the type of the unattended object may be displayed by using a popup screen.

Figure 4C:
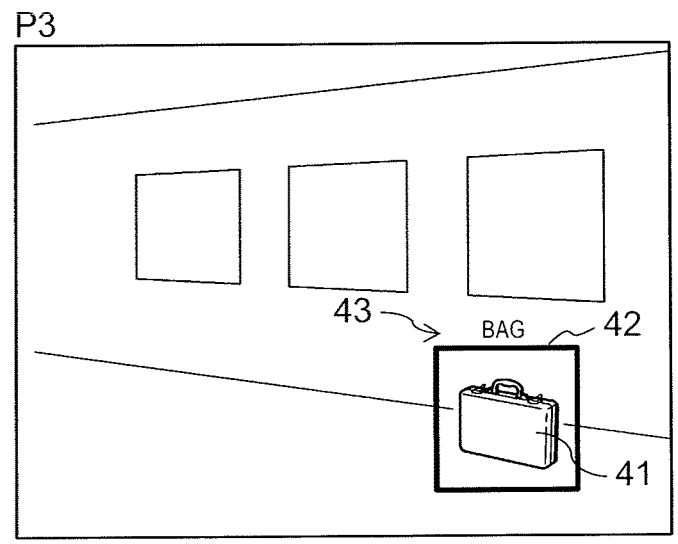
FIG. 4C is a diagram showing an example of notification image P3.

In addition, notification image generator 14 further generates notification image P3 by further superimposing information indicating issuance of an alarm on notification image P2 shown in FIG. 4B based on the alarm issuing time input from alarm issuing time controller 13. FIG. 4C is a diagram showing an example of notification image P3. In the example of FIG. 4C, by changing the color of frame image 42 surrounding bag 41 which is an unattended object to a prominent color, information indicating the issuance of an alarm is superimposed on the notification image. In FIG. 4C, it is indicated that the color of frame image 42 is changed to a prominent color by thickening the line of frame image 42. The information indicating alarm announcement is not limited to changing of the color of frame image 42 surrounding the unattended object, but may be blinking of frame image 42, display of letters, a picture, and the like indicating issuance of an alarm, and the like.

The notification image generated by notification image generator 14 is output to display apparatus 4. In addition, when an unattended object is not detected by unattended object detector 22, notification image generator 14 outputs the captured image input from image acquirer 11 to display apparatus 4 as it is.

Next, the flow of processing in unattended object monitoring apparatus 3 of unattended object monitoring system 1 according to the first embodiment of the present disclosure shown in FIG. 1 will be described with reference to the flowchart of FIG. 5.

First, image acquirer 11 acquires a captured image from imaging apparatus 2 and inputs the captured image to image processor 12 and notification image generator 14 (step ST101). Subsequently, object tracker 21 detects an appearing object (see FIGS. 2A and 2B) appearing in the monitoring area from the captured image (step ST102). In a case where an appearing object is detected (step ST102: Yes), the processing proceeds to step ST103, and in a case where no appearing object is detected (step ST102: No), the processing returns to step ST101.

In step ST103, object tracker 21 starts tracking between the captured images after detection of an appearing object for each detected appearing object. In the following step ST104, unattended object detector 22 detects an appearing object which is not displaced beyond a predetermined time as an unattended object based on the tracking result for each appearing object by object tracker 21. In a case where an unattended object is detected (step ST104: Yes), the processing proceeds to step ST105, and in a case where no unattended object is detected (step ST104: No), the processing returns to step ST101. In a case where the processing returns to step ST101, in the next step ST102, detection of a newly detected appearing object other than the appearing object already detected is performed.

In step ST105, notification image generator 14 superimposes frame image 42 surrounding unattended object 41 on the captured image input from image acquirer 11 to generate notification image P1 (see FIG. 4A) and output the image to display apparatus 4. Next, in step ST106, unattended object type determiner 23 determines the type of unattended object 41 detected by unattended object detector 22. Subsequently, in step ST107, notification image generator 14 superimposes information 43 indicating the type of unattended object 41 on notification image P1 to generate notification image P2 (see FIG. 4B) and output the image to display apparatus 4.

In the next step ST108, alarm issuing time controller 13 selects an alarm issuing time corresponding to the type of the unattended object determined by unattended object type determiner 23 with reference to the table (see FIG. 3) that stores the correspondence relationship between the types of unattended objects and alarm issuing times. Then, in step ST109, an alarm is issued via display apparatus 4 and alarm issuing apparatus 5 at the alarm issuing time corresponding to the type of the unattended object, which is selected by alarm issuing time controller 13. Specifically, notification image generator 14 generates notification image P3 (see FIG. 4C), outputs the image to display apparatus 4, and drives alarm issuing apparatus 5 to issue an alarm.

As described above, according to the first embodiment, because the alarm issuing time from when an unattended object is detected to the time when an alarm is issued may be controlled according to the type of the unattended object, it is possible to control the alarm issuing time according to the degree of suspiciousness or danger of the unattended object. In addition, in this way, it is possible to reduce the burden on the observer when a plurality of unattended objects are detected in the monitoring area at substantially the same time or within a short time, in particular. In the above embodiment, articles such as paper bags and bags are exemplified as types of unattended objects, but not limited to the articles, persons may also be set as a type of an unattended object. In this case, because the urgency of protection is high for a person in an immovable state for reasons such as drunkenness, falling, or the like, the alarm issuing time may be set to "immediately".

Second Embodiment

Figure 6:
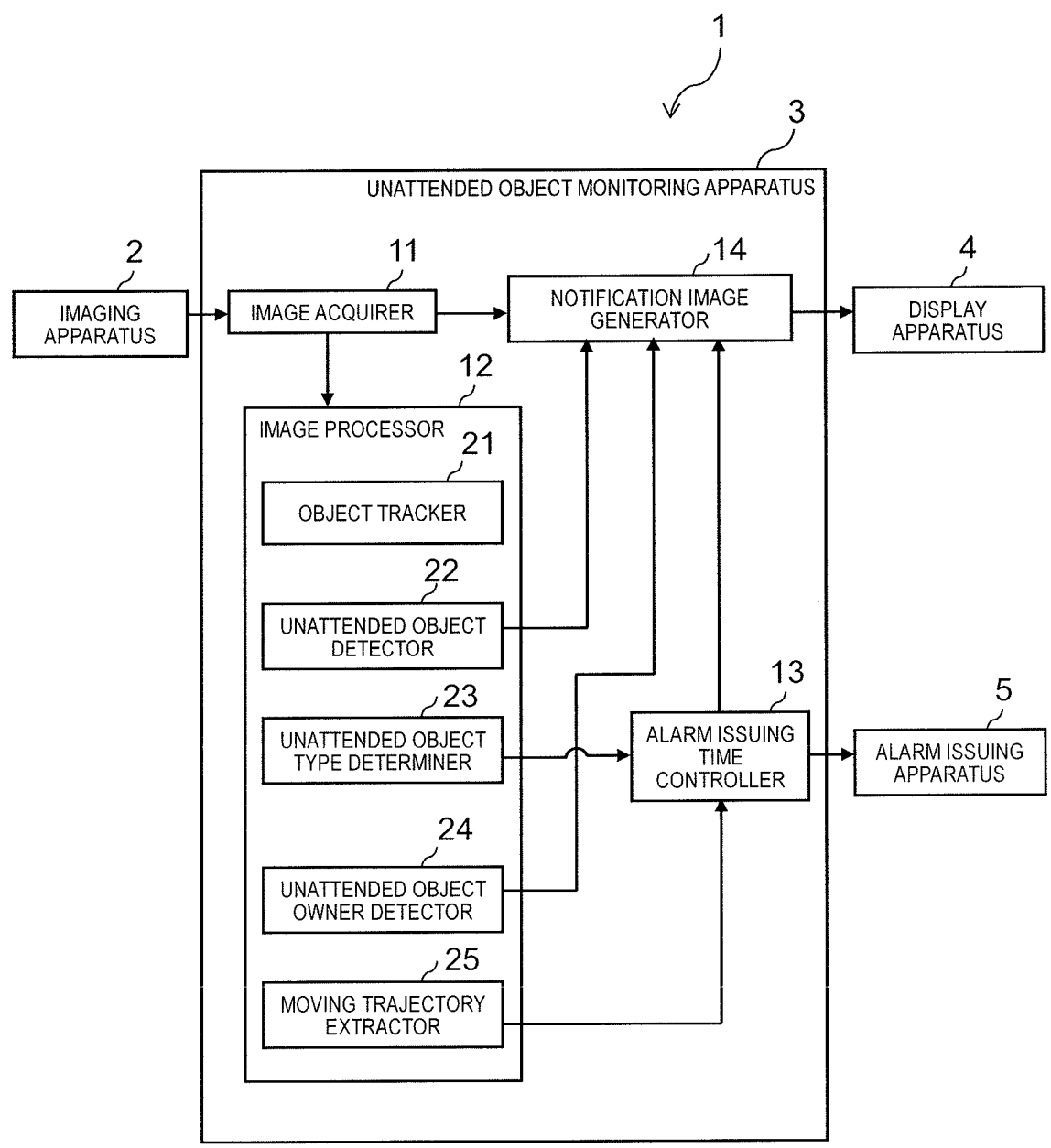
FIG. 6 is a schematic configuration diagram of an unattended object monitoring system according to a second embodiment.
Figure 7A:
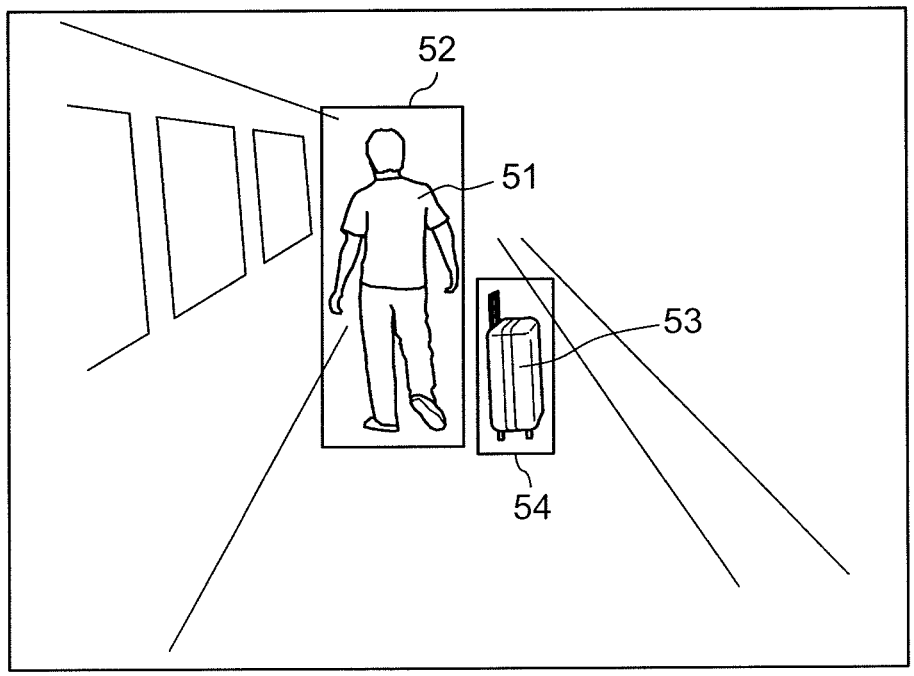
FIG. 7A is a diagram showing an example of notification image P4.
Figure 7B:
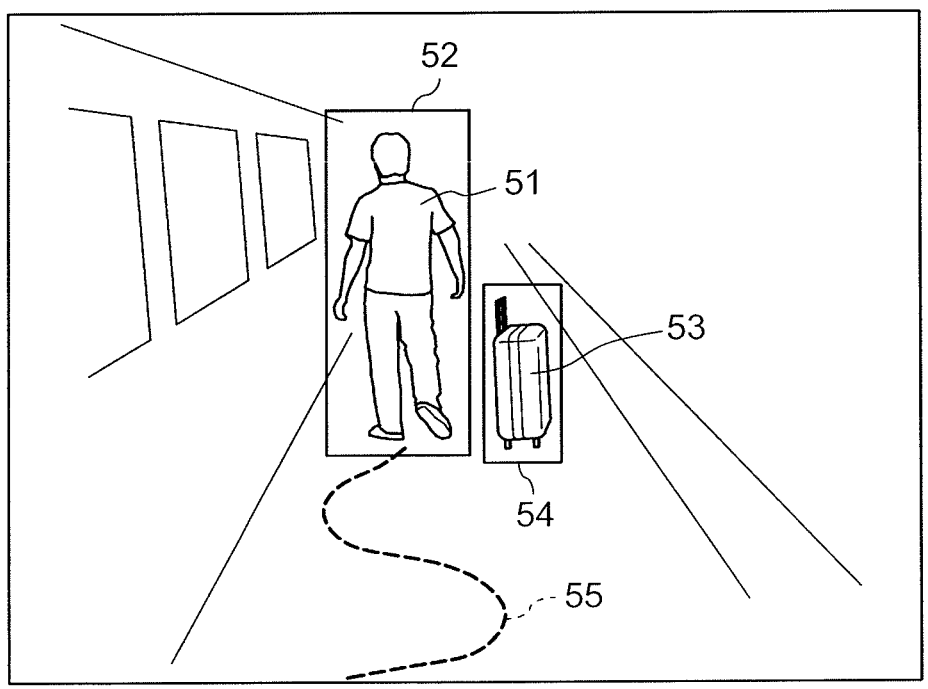
FIG. 7B is a diagram showing a moving trajectory of the owner of the unattended object.
Figure 8:
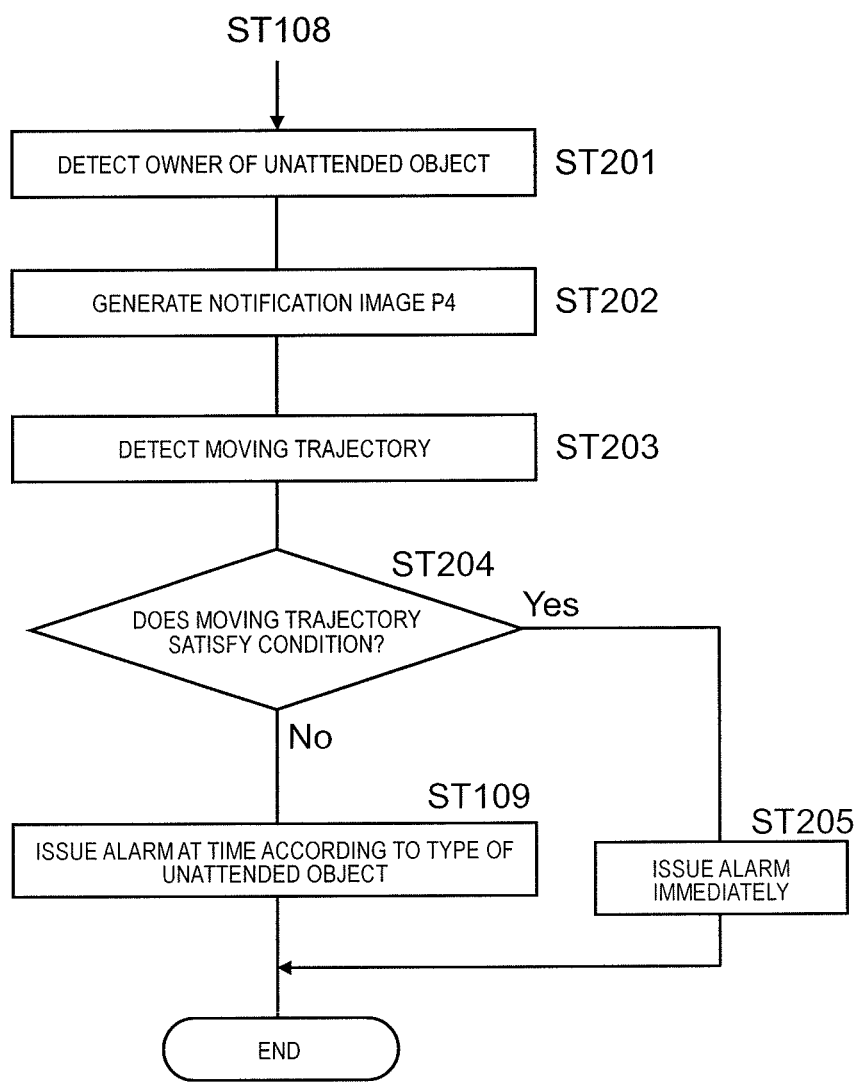
FIG. 8 is a flowchart showing the flow of processing in an unattended object monitoring apparatus according to the second embodiment.

Next, unattended object monitoring system 1 according to a second embodiment of the present disclosure will be described with reference to FIGS. 6 to 8. Unattended object monitoring apparatus 3 according to the second embodiment differs from unattended object monitoring apparatus 3 according to the first embodiment shown in FIG. 1 in that unattended object monitoring apparatus 3 further includes unattended object owner detector 24 and moving trajectory extractor 25. Since the other points are the same as those of the first embodiment described above, the same reference numerals are given and the description thereof will be omitted.

In a case where an unattended object is detected by unattended object detector 22, unattended object owner detector 24 detects the owner of the unattended object based on the distance to the unattended object. Specifically, an appearing object other than the unattended object present within a predetermined distance from the unattended object is detected as an owner of the unattended object. In a case where there are a plurality of appearing objects other than the unattended object, the appearing object with the closest distance to the unattended object is detected as an owner of the unattended object. As the distance between the unattended object and the other appearing objects, a distance between the pixels between the unattended object and the other appearing objects in the captured image is used.

When the owner of the unattended object is detected by unattended object owner detector 24, notification image generator 14 superimposes frame image 52 surrounding owner 51 of the unattended object on the captured image input from image acquirer 11 to generate notification image P4. FIG. 7A is a diagram showing an example of notification image P4 generated by notification image generator 14. In the example of FIG. 7A, carry-bag 53 as an unattended object and owner 51 of the unattended object located close thereto are detected. Frame image 54 surrounding unattended object 53 is already superimposed on the captured image when unattended object 53 is detected by unattended object detector 22.

Moving trajectory extractor 25 extracts the moving trajectory of owner 51 of the unattended object past the time of detection of unattended object 53, based on the tracking result for each appearing object by object tracker 21. For example, a moving trajectory of the owner of unattended object 51 within a predetermined period with the end point set as the time at which unattended object 53 is detected is extracted. FIG. 7B is a diagram showing moving trajectory 55 of owner 51 of the unattended object extracted by moving trajectory extractor 25. In the example of FIG. 7B, moving trajectory 55 of owner 51 of the unattended object meanders largely to the left and right.

Alarm issuing time controller 13 determines whether or not moving trajectory 55 of owner 51 of the unattended object extracted by moving trajectory extractor 25 fits a predetermined condition and in a case where it is determined that the condition is satisfied, controls the alarm issuing time so that an alarm is immediately issued via display apparatus 4 and alarm issuing apparatus 5 irrespective of the alarm issuing time according to the type of the unattended object selected by alarm issuing time controller 13 in the first embodiment. Specifically, in a case where moving trajectory 55 largely meanders beyond a predetermined allowable range, an alarm is immediately issued. On the other hand, if it is determined that the condition is not satisfied, an alarm is issued via display apparatus 4 and alarm issuing apparatus 5 at the alarm issuing time according to the type of the unattended object.

Next, the flow of processing in unattended object monitoring apparatus 3 of unattended object monitoring system 1 according to the second embodiment of the present disclosure shown in FIG. 6 will be described with reference to the flowchart of FIG. 8.

The processing in unattended object monitoring apparatus 3 according to the second embodiment is different from the first embodiment in that steps ST201 to ST204 are added and step ST205 following step ST204 is added between step ST108 and step ST109 of the processing in unattended object monitoring apparatus 3 according to the first embodiment described with reference to the flowchart of FIG. 5. Hereinafter, the added steps ST201 to ST205 will be described.

In step ST201 following step ST108 (see FIG. 5), unattended object owner detector 24 detects the owner of the unattended object based on the distance to the unattended object. Subsequently, in step ST202, notification image generator 14 superimposes frame image 52 surrounding owner 51 of the unattended object on the captured image input from image acquirer 11 to generate notification image P4 (see FIG. 7A). In the next step ST203, moving trajectory extractor 25 extracts moving trajectory 55 of owner 51 of the unattended object past the time of detection of unattended object 53, based on the tracking result for each appearing object by object tracker 21 (see FIG. 7B).

In the following step ST204, alarm issuing time controller 13 determines whether or not moving trajectory 55 of owner 51 of the unattended object extracted by moving trajectory extractor 25 fits the predetermined condition. In a case where it is determined that moving trajectory 55 satisfies the condition (step ST204: Yes), the processing proceeds to step ST205, and in a case where it is determined that moving trajectory 55 does not satisfy the condition (step ST204: No), the processing proceeds to step ST108.

Figure 5:
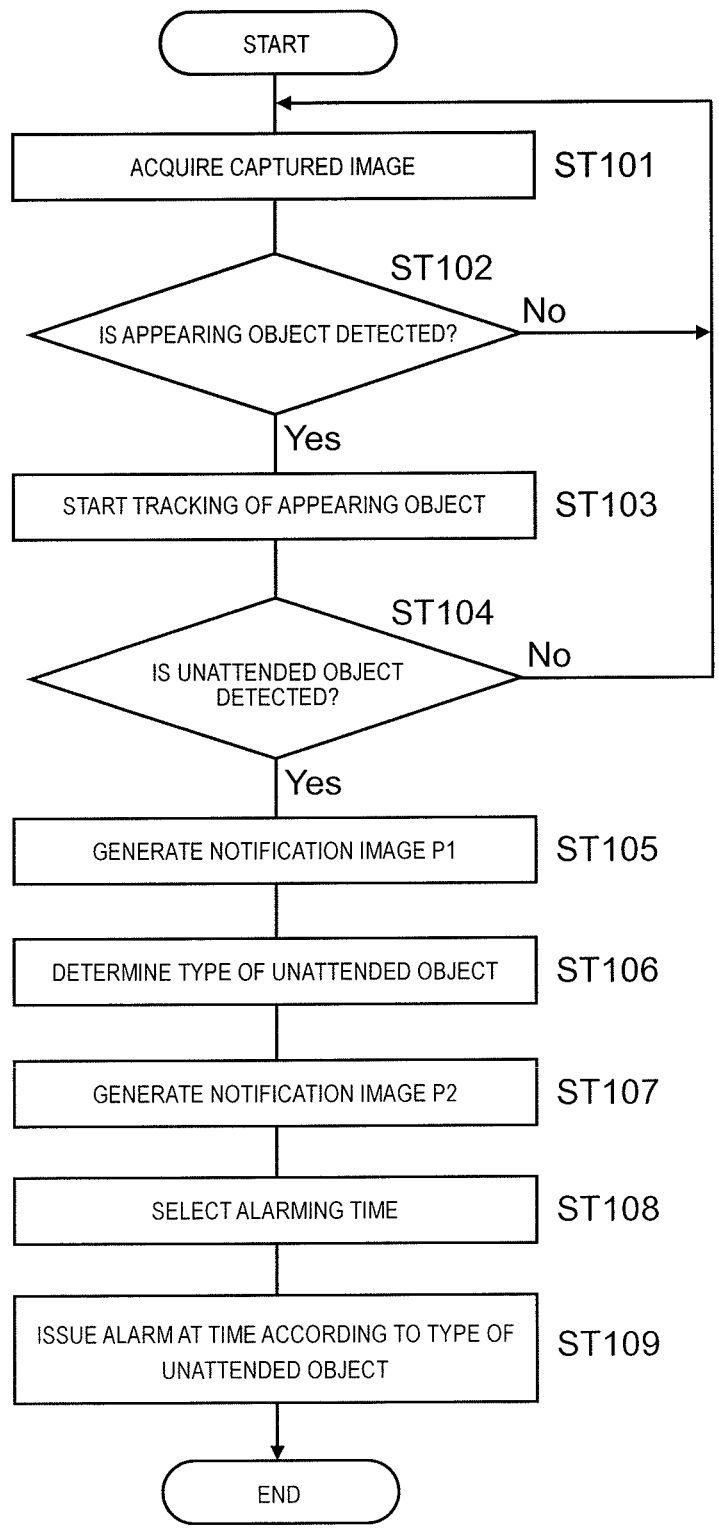
FIG. 5 is a flowchart showing the flow of processing in an unattended object monitoring apparatus according to the first embodiment.

In step ST205, an alarm is issued immediately via display apparatus 4 and alarm issuing apparatus 5 irrespective of the alarm issuing time according to the type of the unattended object selected in the previous step ST108 (see FIG. 5). On the other hand, in step ST109, an alarm is issued via display apparatus 4 and alarm issuing apparatus 5 at the alarm issuing time according to the type of the unattended object.

As described above, according to the second embodiment, in a case where the moving trajectory of the owner of the unattended object past the time of detection of the unattended object fits the predetermined condition, an alarm may be issued immediately irrespective of the alarm issuing time according to the type of the unattended object. Thus, for example, in a case where the moving trajectory of the owner of the unattended object past the time of detection of the unattended object is meandering largely to the left and right, it is possible to issue an alarm immediately by determining that the owner of the unattended object is highly likely to be a drunken person. By doing this, it is possible to prevent drunken people from forgetting to leave baggage and to protect drunken people quickly.

Third Embodiment

Figure 9:
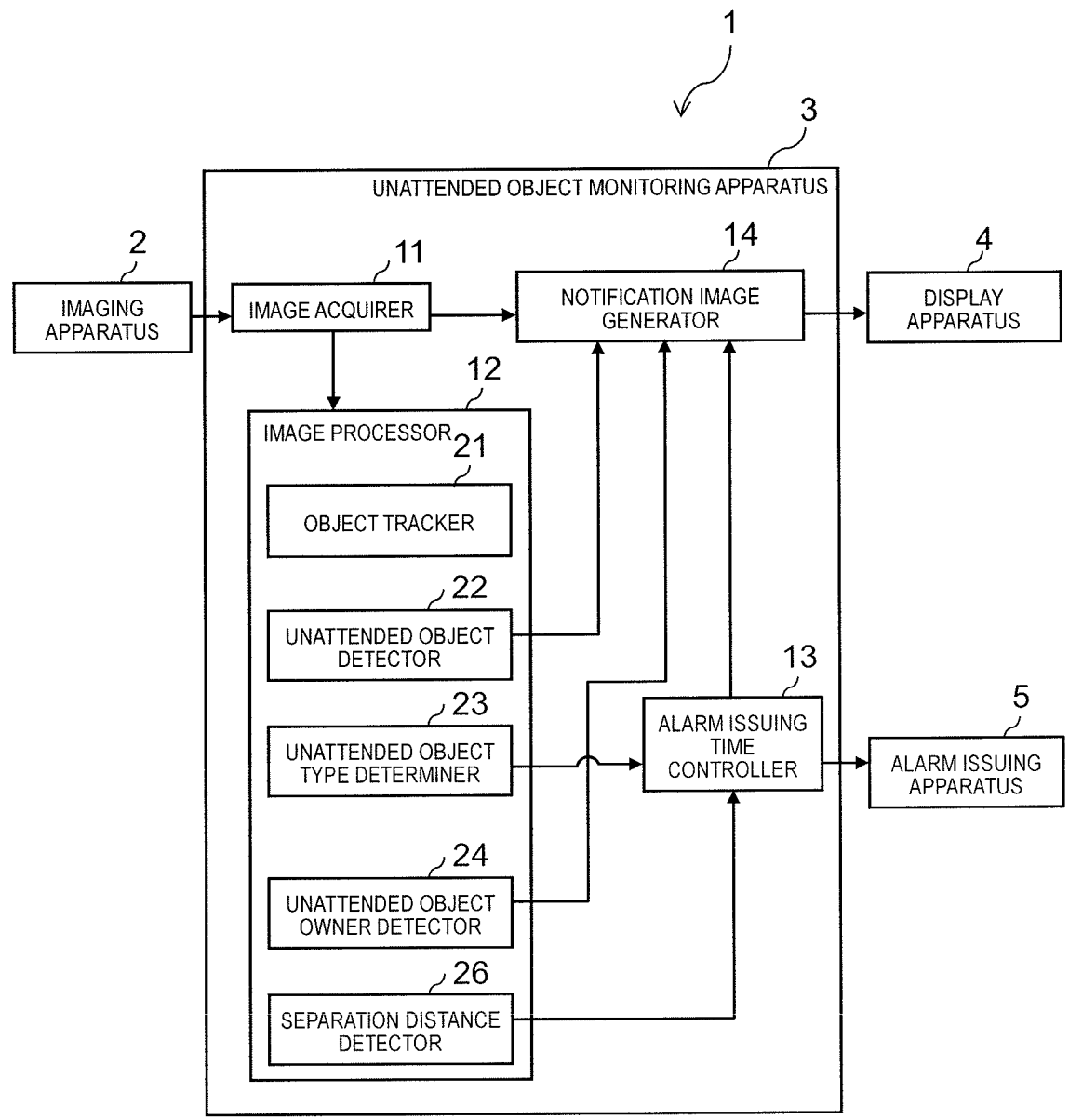
FIG. 9 is a schematic configuration diagram of an unattended object monitoring system according to a third embodiment.
Figure 10A:
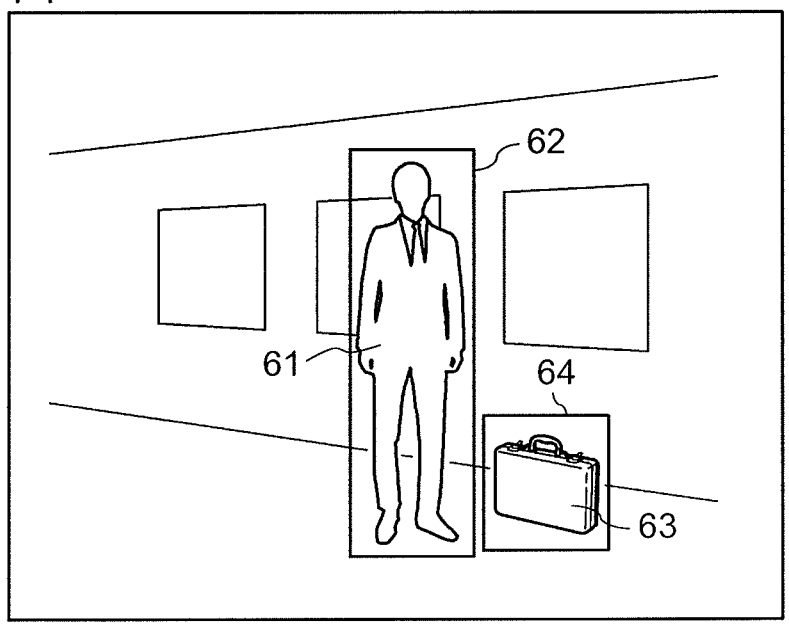
FIG. 10A is a diagram showing an example of notification image P4.
Figure 10B:
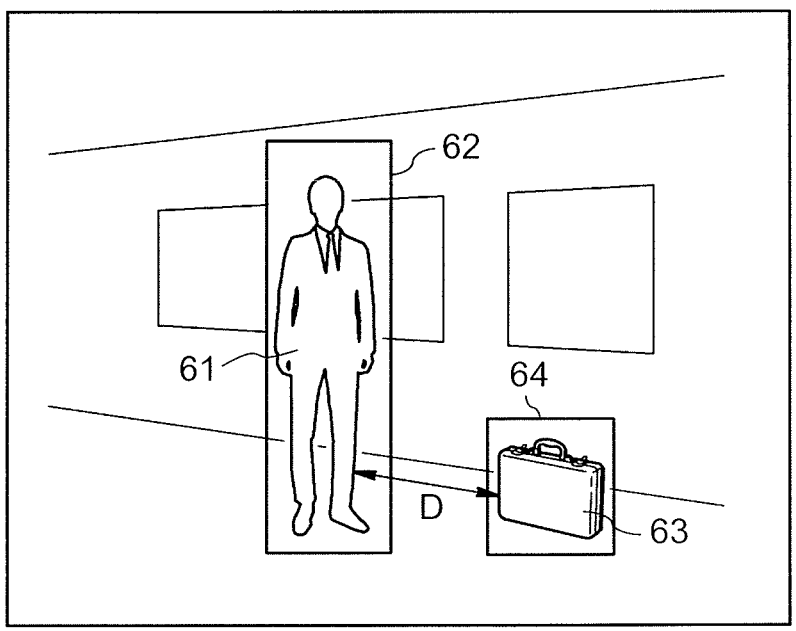
FIG. 10B is a diagram showing a state in which the owner of the unattended object is located in the vicinity of an unattended object.
Figure 11:
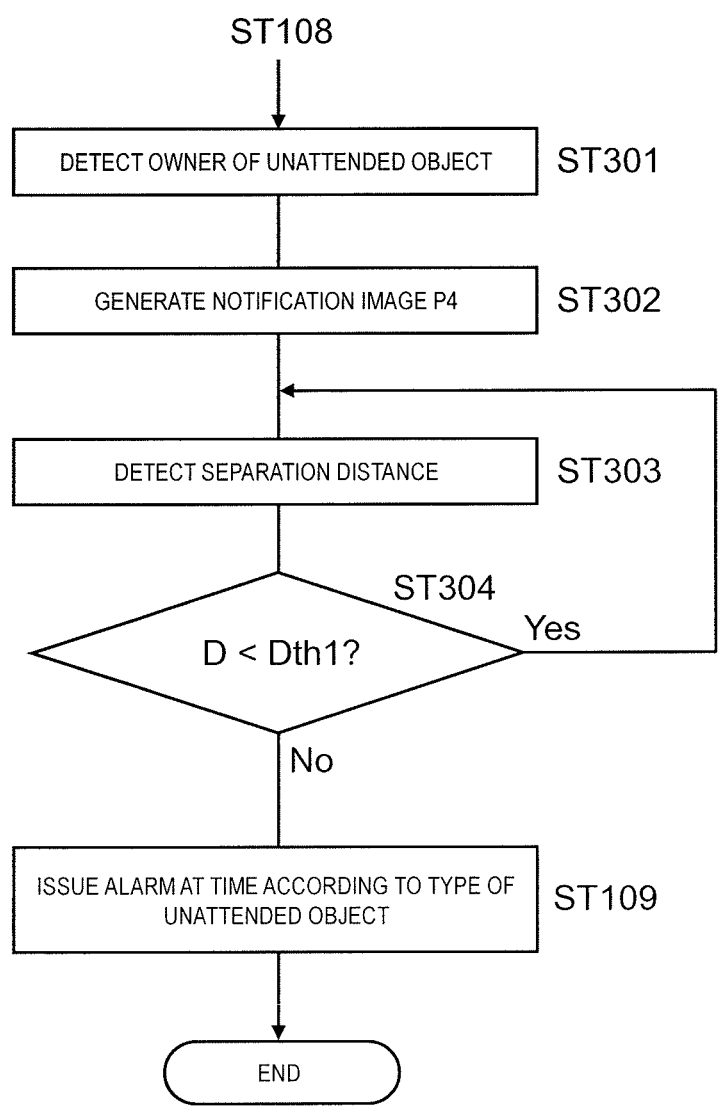
FIG. 11 is a flowchart showing the flow of processing in an unattended object monitoring apparatus according to the third embodiment.

Next, unattended object monitoring system 1 according to a third embodiment of the present disclosure will be described with reference to FIGS. 9 to 11. Unattended object monitoring apparatus 3 according to the third embodiment is different from unattended object monitoring apparatus 3 according to the second embodiment shown in FIG. 6 in that separation distance detector 26 is provided instead of moving trajectory extractor 25. Since the other points are the same as those of the second embodiment described above, the same reference numerals are given and the description thereof will be omitted.

In a case where unattended object owner detector 24 detects an owner of the unattended object, separation distance detector 26 detects a separation distance between the unattended object and the owner of the unattended object based on the tracking result for each appearing object by object tracker 21. Specifically, the distance between the pixels between an unattended object and an owner of the unattended object in the captured image is detected as a separation distance.

When the owner of the unattended object is detected by unattended object owner detector 24, notification image generator 14 superimposes frame image 62 surrounding owner 61 of the unattended object on the captured image input from image acquirer 11 to generate notification image P4. FIG. 10A is a diagram showing an example of notification image P4 generated by notification image generator 14. In the example of FIG. 10A, bag 63 as an unattended object and owner 61 of the unattended object located close thereto are detected. Frame image 64 surrounding unattended object 63 is already superimposed on the captured image when unattended object 63 is detected by unattended object detector 22. FIG. 10B is a diagram showing a state in which owner 61 of the unattended object is located in the vicinity of unattended object 63. Separation distance detector 26 detects separation distance D between owner 61 of the unattended object and unattended object 63 at this time.

Alarm issuing time controller 13 determines whether or not separation distance D detected by separation distance detector 26 is less than predetermined threshold distance Dth1 and in a case where it is determined that separation distance D is less than threshold distance Dth1, controls the alarm issuing time so that an alarm is not issued even if the alarm issuing time according to the type of the unattended object selected by alarm issuing time controller 13 in the first embodiment has elapsed. On the other hand, in a case where it is determined that separation distance D is equal to or greater than threshold distance Dth1, an alarm is issued via display apparatus 4 and alarm issuing apparatus 5 at the alarm issuing time according to the type of the unattended object.

Next, the flow in unattended object monitoring apparatus 3 of unattended object monitoring system 1 according to the third embodiment of the present disclosure shown in FIG. 9 will be described with reference to the flowchart of FIG. 11.

The processing in unattended object monitoring apparatus 3 according to the third embodiment is different from the first embodiment in that steps ST301 to ST304 are added between step ST108 and step ST109 of the processing in the unattended object monitoring apparatus 3 according to the first embodiment described with reference to the flowchart of FIG. 5. Hereinafter, the added steps ST301 to ST304 will be described.

In step ST301 following step ST108 (see FIG. 5), unattended object owner detector 24 detects the owner of the unattended object based on the distance to the unattended object. Subsequently, in step ST302, notification image generator 14 superimposes frame image 62 surrounding owner 61 of the unattended object on the captured image input from image acquirer 11 to generate notification image P4 (see FIG. 10A). In the next step ST303, separation distance detector 26 detects separation distance D between unattended object 63 and owner 61 of the unattended object based on the tracking result for each appearing object by object tracker 21 (see FIG. 10B).

In the following step ST304, alarm issuing time controller 13 determines whether or not separation distance D detected by separation distance detector 26 is less than predetermined threshold distance Dth1. In a case where it is determined that separation distance D is less than threshold distance Dth1 (step ST304: Yes), the processing returns to step ST303, and in a case where it is determined that separation distance D is equal to or greater than threshold distance Dth1 (step ST304: No), the processing proceeds to step ST109. Then, in step ST109, an alarm is issued via display apparatus 4 and alarm issuing apparatus 5 at the alarm issuing time according to the type of the unattended object.

As described above, according to the third embodiment, in a case where the separation distance between the unattended object and the owner of the unattended object is less than a predetermined threshold distance, it is possible to control the alarm issuing time so that an alarm is not issued even if the alarm issuing time according to the type of unattended object has elapsed. As a result, in a case where the owner of the unattended object is present near the unattended object, it is possible to determine that the degree of suspiciousness of the unattended object is low and not to issue an alarm. In addition, in this way, it is possible to further reduce the burden on the observer when a plurality of unattended objects are detected in the monitoring area at substantially the same time or within a short time.

Fourth Embodiment

Figure 12:
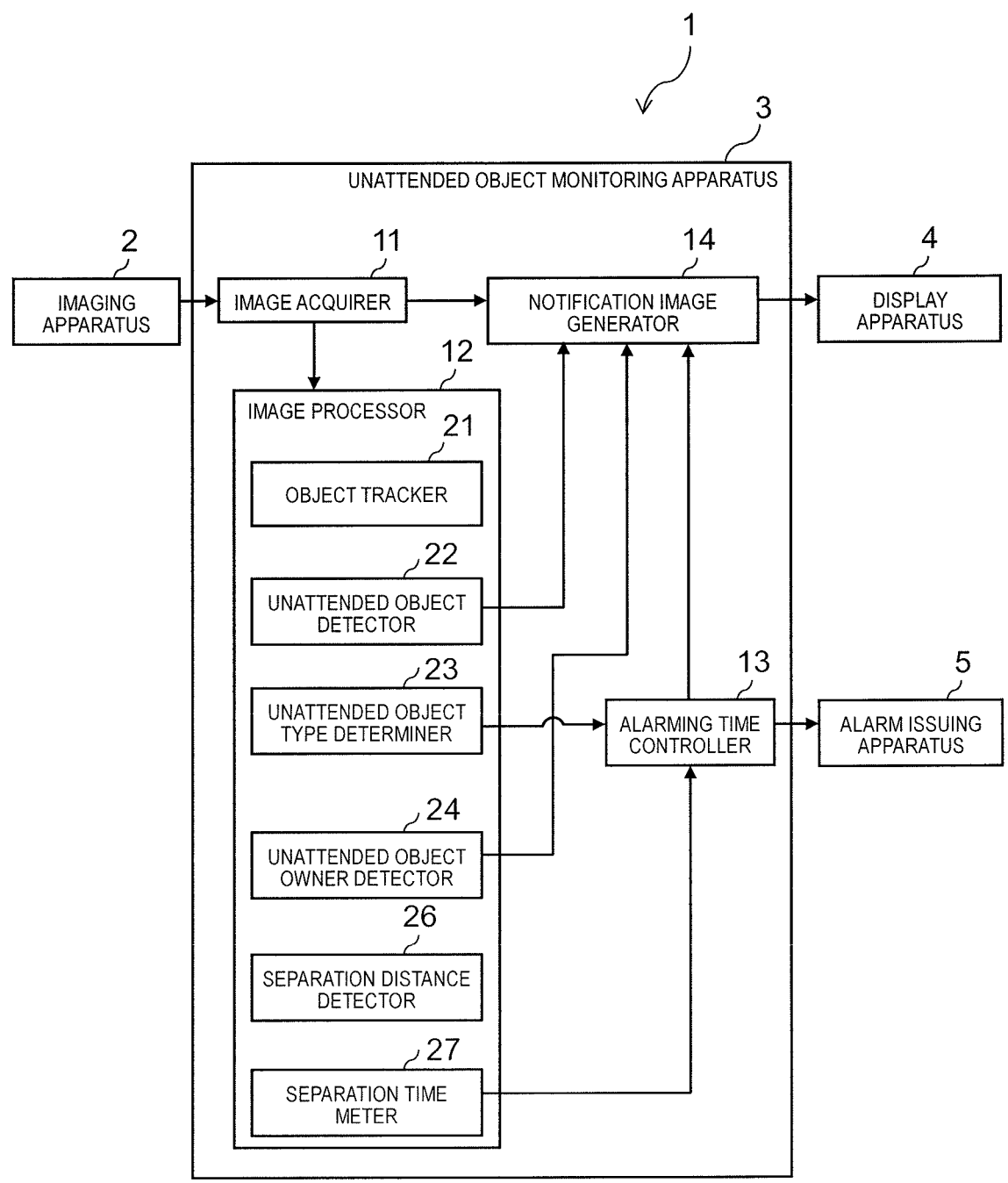
FIG. 12 is a schematic configuration diagram of an unattended object monitoring system according to a fourth embodiment.
Figure 13A:
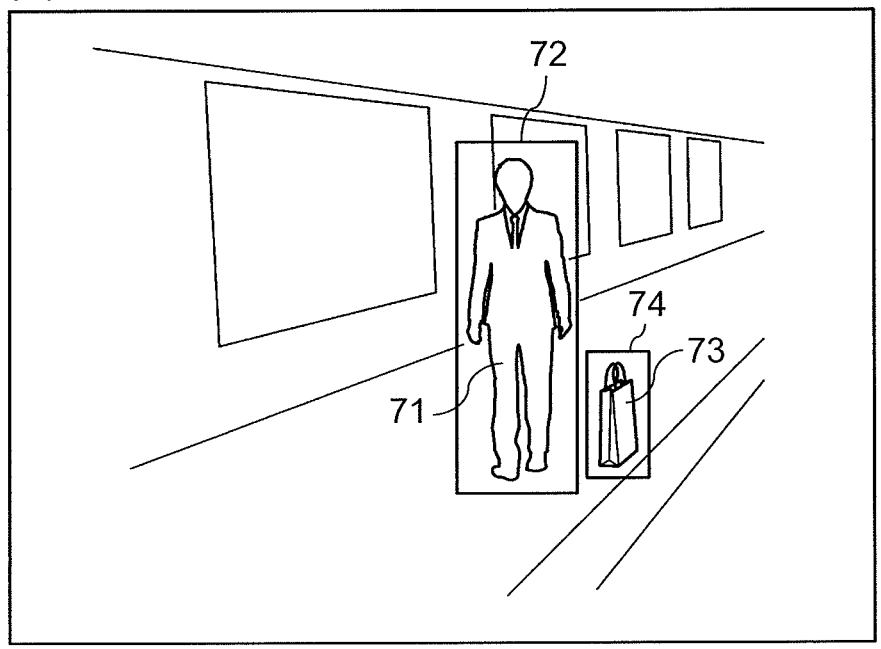
FIG. 13A is a diagram showing an example of notification image P4.
Figure 13B:
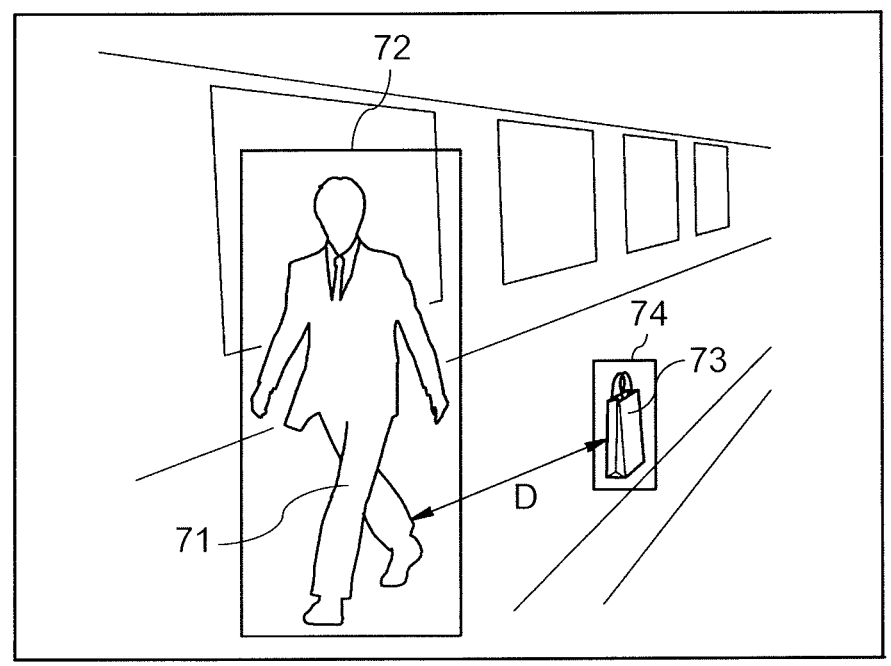
FIG. 13B is a diagram showing a state in which the owner of the unattended object is moving away from the unattended object.
Figure 14:
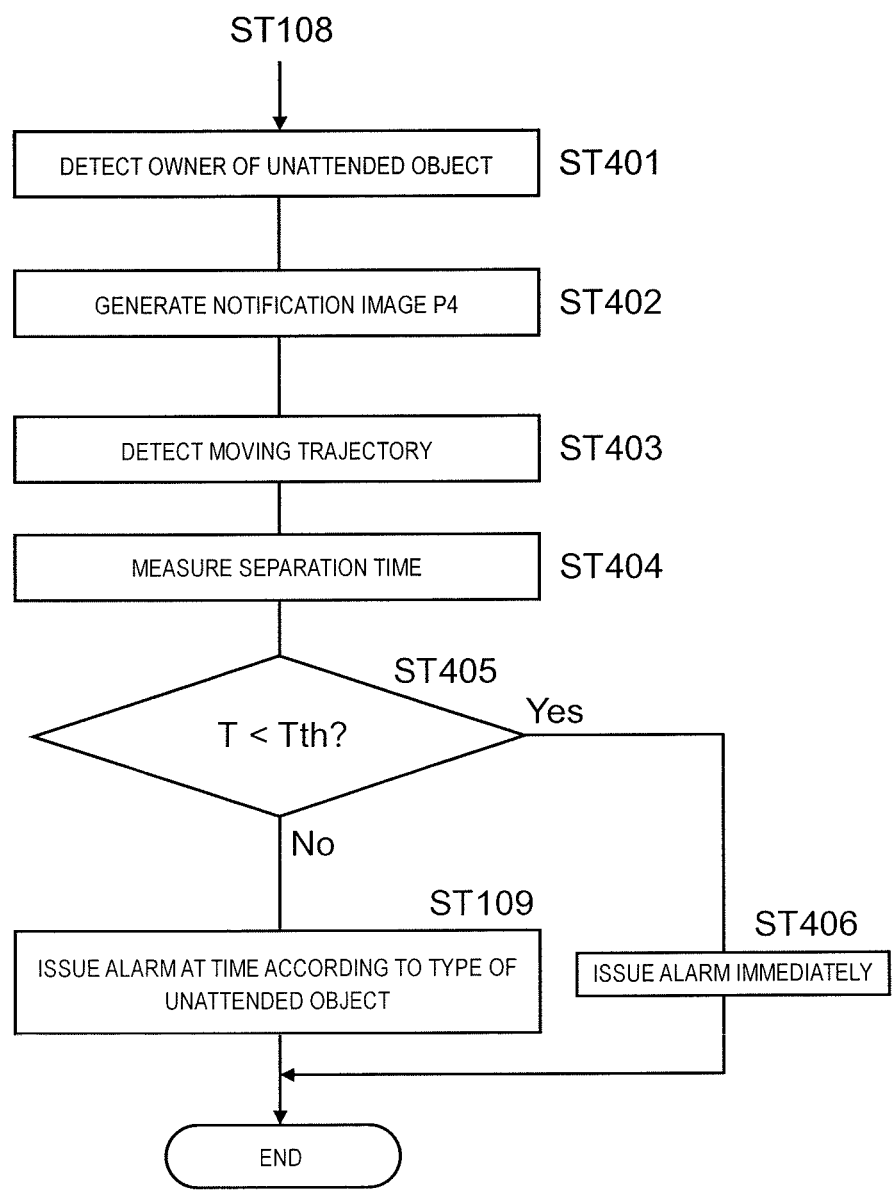
FIG. 14 is a flowchart showing the flow of processing in an unattended object monitoring apparatus according to the fourth embodiment.

Next, unattended object monitoring system 1 according to a fourth embodiment of the present disclosure will be described with reference to FIGS. 12 to 14. Unattended object monitoring apparatus 3 according to the fourth embodiment is different from unattended object monitoring apparatus 3 according to the third embodiment shown in FIG. 9 in that unattended object monitoring apparatus 3 further includes separation time meter 27. Since the other points are the same as those of the third embodiment, the same reference numerals are given and the description thereof will be omitted.

Separation time meter 27 measures the separation time until separation distance D between the unattended object and the owner of the unattended object exceeds predetermined threshold distance Dth2 since the owner of the unattended object was detected by unattended object owner detector 24. Specifically, the time at which the owner of the unattended object is detected by unattended object owner detector 24 and the time at which separation distance D exceeds threshold distance Dth2 are respectively stored, and the difference between both the times is calculated to obtain a separation time. Separation distance D between the unattended object and the owner of the unattended object is detected by separation distance detector 26.

When the owner of the unattended object is detected by unattended object owner detector 24, notification image generator 14 superimposes frame image 72 surrounding owner 71 of the unattended object on the captured image input from image acquirer 11 to generate notification image P4. FIG. 13A is a diagram showing an example of notification image P4 generated by notification image generator 14. In the example of FIG. 13A, paper bag 73 as an unattended object and owner 71 of the unattended object located close thereto are detected. Frame image 74 surrounding unattended object 73 is already superimposed on the captured image when unattended object 73 is detected by unattended object detector 22. FIG. 13B is a diagram showing a state in which owner 71 of unattended object 73 is moving away from the unattended object. Separation distance detector 26 detects separation distance D between owner 71 of the unattended object and unattended object 73 at this time. Separation time meter 27 measures the time from the time when the owner of the unattended object is detected by unattended object owner detector 24 to the time when separation distance D exceeds threshold distance Dth2.

Alarm issuing time controller 13 determines whether or not separation time T measured by separation time meter 27 is less than predetermined threshold time Tth and in a case where it is determined that separation time T is less than threshold time Tth, controls the alarm issuing time so that an alarm is immediately issued via display apparatus 4 and alarm issuing apparatus 5 irrespective of the alarm issuing time according to the type of the unattended object selected by alarm issuing time controller 13 in the first embodiment. On the other hand, in a case where it is determined that separation time T is equal to or greater than threshold time Tth, an alarm is issued via display apparatus 4 and alarm issuing apparatus 5 at the alarm issuing time according to the type of the unattended object.

Next, the flow in unattended object monitoring apparatus 3 of unattended object monitoring system 1 according to the fourth embodiment of the present disclosure shown in FIG. 12 will be described with reference to the flowchart of FIG. 14.

The processing in unattended object monitoring apparatus 3 according to the fourth embodiment is different from the first embodiment in that steps ST401 to ST404 are added and step ST405 following step ST404 is added between step ST108 and step ST109 of the processing of unattended object monitoring apparatus 3 according to the first embodiment described with reference to FIG. 5. Hereinafter, the added steps ST401 to ST405 will be described.

In step ST401 following step ST108 (see FIG. 5), unattended object owner detector 24 detects the owner of the unattended object based on the distance to the unattended object. Subsequently, in step ST402, notification image generator 14 superimposes frame image 72 surrounding owner 71 of the unattended object on the captured image input from image acquirer 11 to generate notification image P4 (see FIG. 13A).

In the next step ST403, separation distance detector 26 detects separation distance D between unattended object 73 and owner 71 of the unattended object based on the tracking result for each appearing object by object tracker 21. In the following step ST404, separation time meter 27 measures the separation time until separation distance D (see FIG. 13B) between the unattended object and owner 71 of unattended object 73 exceeds predetermined threshold distance Dth2 since the owner of the unattended object was detected by unattended object owner detector 24.

Next, in step ST405, alarm issuing time controller 13 determines whether or not separation time T measured by separation time meter 27 is less than predetermined threshold time Tth. In a case where it is determined that separation time T is less than threshold time Tth (step ST405: Yes), the processing proceeds to step ST406, and in a case where it is determined that separation time T is equal to or greater than threshold time Tth (step ST405: No), the processing proceeds to step ST109.

In step ST406, an alarm is issued immediately via display apparatus 4 and alarm issuing apparatus 5 irrespective of the alarm issuing time according to the type of the unattended object selected in step ST108 (see FIG. 5). On the other hand, in step ST109, an alarm is issued via display apparatus 4 and alarm issuing apparatus 5 at the alarm issuing time according to the type of the unattended object.

As described above, according to the fourth embodiment, in a case where the separation time until the separation distance between the unattended object and the owner of the unattended object exceeds a predetermined distance is less than a predetermined threshold time since the owner of the unattended object was detected, an alarm may be issued immediately irrespective of the alarm issuing time according to the type of the unattended object. As a result, in a case where the owner of the unattended object leaves immediately from the unattended object, since the behavior of the owner of the unattended object is suspicious, it is determined that the degree of suspiciousness of the unattended object is high and to immediately issue an alarm.

Although the present disclosure has been described based on specific embodiments, these embodiments are merely examples, and the present disclosure is not limited by these embodiments. All the constituent elements of the unattended object monitoring apparatus according to the present disclosure, the unattended object monitoring system provided with the same, and the unattended object monitoring method described in the above embodiment are not necessarily all essential and may be appropriately selected without departing from the scope of the present disclosure.

INDUSTRIAL APPLICABILITY

An unattended object monitoring apparatus, an unattended object monitoring system provided with the same, and an unattended object monitoring method according to the present disclosure are useful as an unattended object monitoring apparatus capable of controlling an alarm issuing time according to a degree of suspiciousness or danger of an unattended object, an unattended object monitoring system provided with the same, an unattended object monitoring method, and the like.

REFERENCE MARKS IN THE DRAWINGS

1 UNATTENDED OBJECT MONITORING SYSTEM
2 IMAGING APPARATUS
3 UNATTENDED OBJECT MONITORING APPARATUS
4 DISPLAY APPARATUS (NOTIFICATION APPARATUS)
5 ALARM ISSUING APPARATUS (NOTIFICATION APPARATUS)
11 IMAGE ACQUIRER
12 IMAGE PROCESSOR
13 ALARM ISSUING TIME CONTROLLER
14 NOTIFICATION IMAGE GENERATOR
21 OBJECT TRACKER
22 UNATTENDED OBJECT DETECTOR
23 UNATTENDED OBJECT TYPE DETERMINER
24 UNATTENDED OBJECT OWNER DETECTOR
25 MOVING TRAJECTORY EXTRACTOR
26 SEPARATION DISTANCE DETECTOR
27 SEPARATION TIME METER

The invention claimed is:

1. An unattended object monitoring apparatus that detects an unattended object left behind in a monitoring area based on a captured image of the monitoring area imaged by an imaging apparatus and issues an alarm in a case where the unattended object is detected, the apparatus comprising:
a processor; and
a memory that stores an instruction,
the apparatus further comprising, as a configuration when the processor executes the instruction stored in the memory;
an image acquirer that acquires a captured image of the monitoring area imaged by the imaging apparatus;
an object tracker that detects an object appearing in the monitoring area from the captured image and tracks between the captured images for each detected object;
an unattended object detector that detects the object not displaced beyond a predetermined time as an unattended object based on a tracking result for each detected object by the object tracker;
an unattended object type determiner that determines a type of the detected unattended object; and
an alarm issuing time controller that controls an alarm issuing time from when the unattended object is detected to the time when an alarm is issued according to the type of the unattended object determined.

2. The unattended object monitoring apparatus of claim 1, further comprising:
an unattended object owner detector that detects an owner of the unattended object from the detected object based on a distance to the unattended object in a case where the unattended object is detected; and
a moving trajectory extractor that extracts a moving trajectory of the owner of the unattended object past the time of detection of the unattended object based on the tracking result for each detected object by the object tracker,
wherein the alarm issuing time controller controls an alarm issuing time so that an alarm is issued immediately irrespective of the alarm issuing time according to the type of the unattended object in a case where the extracted moving trajectory fits a predetermined condition.

3. The unattended object monitoring apparatus of claim 1, further comprising:
an unattended object owner detector that detects an owner of the unattended object based on a distance to the unattended object in a case where the unattended object is detected; and
a separation distance detector that detects a separation distance between the unattended object and the owner of the unattended object based on the tracking result for each detected object by the object tracker,
wherein the alarm issuing time controller controls the alarm issuing time so as not to issue an alarm even if the alarm issuing time according to the type of the unattended object has elapsed in a case where the detected separation distance is less than a predetermined threshold distance.

4. The unattended object monitoring apparatus of claim 3, further comprising:
a separation time meter that measures a separation time from the time when the owner of the unattended object is detected to the time when the separation distance exceeds a predetermined distance,
wherein the alarm issuing time controller controls the alarm issuing time so that an alarm is issued immediately irrespective of the alarm issuing time according to the type of the unattended object in a case where the measured separation time is less than a predetermined threshold time.

5. The unattended object monitoring apparatus according to claim 1, further comprising:
a notification image generator that generates a notification image in which a frame image surrounding the unattended object or the owner of the unattended object is superimposed on the captured image when the unattended object or the owner of the unattended object is detected.

6. The unattended object monitoring apparatus according to claim 1, further comprising:
a notification image generator that generates a notification image in which information indicating a type of the unattended object is superimposed on the captured image when the type of the unattended object is determined.

7. An unattended object monitoring system comprising:
the unattended object monitoring apparatus according to claim 1;
an imaging apparatus for imaging a monitoring area; and
a notification apparatus that notifies a user of the alarm issued from the unattended object monitoring apparatus.

8. An unattended object monitoring method for detecting an unattended object left behind in a monitoring area based on a captured image of the monitoring area imaged by an imaging apparatus and issues an alarm when the unattended object is detected, the method comprising:
- acquiring a captured image of the monitoring area imaged by the imaging apparatus;
- detecting an object appearing in the monitoring area from the captured image and tracks between the captured images for each detected object;
- detecting the object not displaced beyond a predetermined time as an unattended object based on a tracking result for each detected object;
- determining a type of the detected unattended object; and
- controlling an alarm issuing time from when the unattended object is detected to the time when an alarm is issued according to the type of the unattended object determined.

* * * * *